United States Patent
Horachi et al.

(10) Patent No.: US 7,002,734 B2
(45) Date of Patent: Feb. 21, 2006

(54) PRE-AMPLIFIER GAIN SETTING METHOD UTILIZING ASE LIGHT AND WDM OPTICAL TRANSMISSION APPARATUS EMPLOYING THE METHOD

(75) Inventors: Kazunori Horachi, Kawasaki (JP); Taro Asao, Kawasaki (JP); Nobuyuki Nemoto, Kawasaki (JP); Kazuo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 10/336,712

(22) Filed: Jan. 6, 2003

(65) Prior Publication Data

US 2003/0231376 A1 Dec. 18, 2003

(30) Foreign Application Priority Data

Jun. 17, 2002 (JP) .................................... 2002-175635

(51) Int. Cl.
  *H01S 3/00* (2006.01)
  *H04B 10/20* (2006.01)

(52) U.S. Cl. ............................ 359/341.4; 398/59
(58) Field of Classification Search ............ 398/59; 359/341.4, 341.41, 341.42
See application file for complete search history.

(56) References Cited

U.S. PATENT DOCUMENTS

| 6,621,621 B1 * | 9/2003 | Jones et al. ............ 359/337.11 |
| 2002/0149817 A1 * | 10/2002 | Kiliccote et al. ........... 359/119 |
| 2002/0186459 A1 * | 12/2002 | Degrande et al. ........ 359/341.4 |
| 2003/0106990 A1 * | 6/2003 | Tomofuji et al. ..... 250/214 LA |
| 2004/0052530 A1 * | 3/2004 | Tian et al. .................... 398/83 |

* cited by examiner

Primary Examiner—Bernarr E. Gregory
Assistant Examiner—Deandra M. Hughes
(74) Attorney, Agent, or Firm—Staas & Halsey LLP

(57) ABSTRACT

A WDM optical transmission apparatus is disclosed utilizing ASE light. The WDM optical transmission apparatus includes a pre-amplifier having two control modes consisting of ALC mode in which the gain of an optical amplifier is controlled such that the total output of the optical amplifier is constant for a multiplexed wavelength number n, and of AGC mode which is a control mode maintaining constant the ratio of an optical input level to an optical output level for the multiplexed wavelength number n; and a post-amplifier having two control modes consisting of ASE mode in which the gain of the post-amplifier is set higher than that in the AGC mode and is set such that the output level of ASE light corresponds to the multiplexed wavelength number n, and of the AGC mode; wherein in the ASE mode, the gain of the pre-amplifier in the WDM optical transmission apparatus at the next node is set under an ALC control utilizing ASE light output from the post-amplifier.

14 Claims, 12 Drawing Sheets

PRE-AMPLIFIER GAIN SETTING METHOD UTILIZING ASE LIGHT AND WDM OPTICAL TRANSMISSION APPARATUS EMPLOYING THE METHOD

BACKGROUND OF THE INVENTION

1. Field of the Invention

The present invention relates to a wavelength division multiplexing (WDM) transmission apparatus applied to a WDM optical transmission system. More particularly, the invention relates to setting of the gain of a pre-amplifier utilizing ASE (Amplified Spontaneous Emission) light in the WDM optical transmission apparatus.

2. Description of the Related Arts

Optical transmission systems employing WDM technique are in practical use. As for the WDM optical transmission apparatuses used in such optical transmission systems, in the increasing progress of the optical transmission technology in recent years, practical use of WDM ring networks using optical ADM apparatuses supporting the function for inserting/dividing (ADD/DROP) optical signals by every optical wavelength as a unit and an optical path protection switching function has been required.

FIG. 1 illustrates an example of the structure of a WDM transmission apparatus placed in each node in a network. The portion surrounded by the dotted line is an optical ADM apparatus 100 having functions for inserting/dividing (ADD/DROP) an optical signal and as an optical path protection switch.

Wavelength division multiplexed (WDM) signals are input bi-directionally on the input side and the output side of this optical ADM apparatus 100 and are input through pre-amplifiers 101, 115 to wavelength demultiplexing apparatuses 102, 114 in the optical ADM apparatus 100. The WDM signals are separated into optical signals having respective wavelengths in the wavelength demultiplexing apparatuses 102, 114.

The wavelength demultiplexed optical signals are input into an optical switch unit 103, switched to a predetermined route and output. Furthermore, at a node an optical signal is inserted (ADD) from a transponder not shown in FIG. 1 and is branched (DROP).

Now, a schematic view of the function of the optical switch unit 103 is shown in FIG. 2. In FIG. 2, the switch unit 103 is mounted with a 2×2 switch for each wavelength λ. Each 2×2 switch has two states of Through setting (FIG. 2A) and ADD/DROP setting (FIG. 2B).

In the Through setting in FIG. 2A, the output signals from the pre-amplifiers 101, 115 are switched to the input sides of post-amplifiers 105, 111 through the 2×2 switch 103-1.

In ADD/DROP setting shown in FIG. 2B, a signal on an working side W from a transponder not shown in the figure is input from an ADD terminal 125 and is switched to the input sides of the post-amplifiers 105, 111 through a 2×1 switch 103-2 and the 2×2 switch 103-1. Furthermore, when dividing a signal at this node being input from the pre-amplifiers 101, 115, the signal is switched to the working side and an auxiliary side and divided by a coupler 103-3 through the 2×2 switch 103-1.

The wavelength demultiplexed optical signal output from the optical switch 103 and the optical signal inserted through the 2×1 switch 103-2 are adjusted for their levels through Variable Optical Attenuators 106, 116 and are input to wavelength multiplexing apparatuses 104, 112. Then, the optical signals are again input to the post-amplifiers 105, 111 as WDM signals wavelength multiplexed at the apparatuses 104, 112.

In such a conventional WDM transmission apparatus shown in FIG. 1 and FIG. 2, the post-amplifiers 105, 111 are always operated in an AGC mode and the pre-amplifiers 101, 115 are operated in the AGC mode after they have been undergone with gain setting in an ALC mode.

Now, the meanings of the AGC mode and the ALC mode will be described.

The AGC (Automatic Gain Control) mode is a control mode maintaining the ratio of optical input levels into post-amplifiers 105, 111, optical amplifiers, and the optical output levels from them (i.e., gain) constant.

In the AGC mode, when an input level into an optical amplifier is varied, the output level of the optical amplifier also varies following the input level because the gain of the optical amplifier is constant. When the number of multiplexed wavelengths of an optical signal input into an optical amplifier varies, because of the constant gain, the output level of each wavelength does not vary if the input level of each wavelength does not vary. Thus, the services using the existing wavelengths is not affected if a new wavelength is added or a wavelength is deleted.

On the other hand, where the targeted output level per one (1) wave having the number of multiplexed wavelengths n is represented by Pn, the ALC (Automatic Level Control) mode is a mode for controlling the gain of an optical amplifier such that the total output Po from the optical amplifier is maintained constant (=Pn×n) being independent of the input levels into the pre-amplifiers 101, 115, optical amplifiers. Therefore, an optical amplifier needs information about the number of multiplexed wavelengths n to obtain the total output Po.

That is, in the ALC mode, an optical amplifier is controlled such that the total output level of the optical amplifier is maintained constant even when the input level into the optical amplifier varies.

Thus, when one of the wavelength multiplexed wavelengths in the optical signal input into an optical amplifier is off, the total output level is controlled by the ALC control to be maintained constant. Thus, the wavelength components except for the wavelength which is off are more strongly amplified.

As a result, because the information about the number of the multiplexed wavelengths n is updated later than the variation of the optical level at the time when a wave is made off has been updated, a data error is likely to occur due to a deviation from the targeted output level during the time period between the updates.

On the other hand, when a new wave is added to an optical signal to be input into an optical amplifier, the optical amplifier output level of the wavelengths except for the added wavelength is lowered until the number of the multiplexed wavelengths n is updated because the total output level is maintained constant by the ALC control.

As described above, in the ALC mode, the output level of each wavelength varies when the number of wavelengths input into an optical amplifier is increased or decreased and an error occurs in the signal when the output level deviates from the tolerance of the input level of an O/S (optical/Signal) conversion module receiving this light with the wavelengths.

Therefore, the mode is switched into the AGC mode after a gain setting has been completed in ALC mode in advance in order to maintain the targeted output level constant if an increase or decrease of the number of the wavelengths occurs.

The sequence of a pre-amplifier gain setting in such a conventional apparatus is shown in FIG. 3. Then, the relation between a node 1 and a node 2 connected to each other through an optical transmission path 122 as shown in FIG. 4 will be described.

The number of the wavelengths is notified by a control unit not shown in FIG. 1 to the post-amplifier 105 at the node 1 as an initial setting (Process 1). Then, as described later, the number of the wavelengths is notified by an OSC (Optical Supervisory Channel) signal one after another up to the pre-amplifier 201 at the next node 2 because the number of the wavelengths is necessary for gain setting at a pre-amplifier 201 at the next node 2 (Process P1-1, P1-2, P1-3).

The post-amplifier 105 always operates in the AGC mode when its input level exceeds the threshold value while it is being activated (Process P2) and its output level becomes stable when Variable Optical Attenuator (VOA) 106 is adjusted by the control of variable optical attenuation controller 107. When the output level becomes stable, output stability information is generated (Process P3). This output stability information is sent to an OSC unit, described later, at the node 1 (Process P2-1). Then, as shown in FIG. 4, the output stability information is superimposed on the OSC signal and is sent to the OSC unit at the next node 2 through the optical transmission path 122 (Process P2-2).

Now, in order to stabilize the output level of the post-amplifier 105, it is necessary for a through light (see FIG. 2A) to be stable without any variation of the number of wavelengths and it is necessary for an inserted (ADD) light to be stable without any variation of the number of wavelengths and necessary that the output light from the transponder is stable.

Therefore, the post-amplifier 105 supervises the output level and sends post-amplifier output level stabilizing bits to the pre-amplifier 201 at the next node 2 by the OSC signal as output stability information. At the node 2, such output stability information is obtained from the OSC signal and sent to the pre-amplifier 201 at the node 2 (Process P3-3). At the pre-amplifier 201 at the node 2, when it is known by the wavelength information from the post amplifier 104 at the previous node 1 that the number of the wavelengths is one (1) or more and, the output stability information is received, a gain setting is conducted in the ALC mode (Process P4). When the gain setting is completed, the mode of the pre-amplifier 201 shifts to the AGC mode (Process P5).

In this way, in the conventional WDM transmission apparatus, the post-amplifiers 105, 111 are always in the AGC mode and the pre-amplifiers 101, 115 can not conduct any gain setting in the ALC mode without an optical input corresponding to the level of one (1) or more wavelengths.

Therefore, as a system, it is possible to conduct a gain setting for the pre-amplifiers 101, 115 over a span (space between nodes) where an optical level of one (1) or more wavelengths exists.

However, when the working line is switched to the auxiliary line because of occurrence of a failure or when the network is re-constructed, the span becomes zero (0) wavelength span and the optical level becomes lower than that of one (1) level. As a result, the input level of the post-amplifiers vary because of the variation of the number of the wavelengths and the pre-amplifier at the previous node being conducted a gain setting. In such a case, it is impossible to conduct any gain setting. In terms of this, in the conventional system, this process can not be called an activation that is completely span-independent.

In this way, in the conventional WDM transmission apparatus, in such cases as where activating the apparatus after recovering from a failure or where newly activating a system constructed in a network, it is possible to conduct a gain setting of the pre-amplifier at the next node only when the conditions that the optical level input into the post-amplifier in the span exist exceeding that of one (1) wavelength and that the output is stable are satisfied.

That is, in the pre-amplifier, the gain setting is not conducted when the post-amplifier output level stabilizing bits does not indicate the stability of the pre-amplifier. In other words, the gain setting of the pre-amplifier of the next node can not be started when the optical level input into the post-amplifier does not become stable.

Likewise, in a ring network in which a plurality of nodes are connected in a ring, when gain setting of pre-amplifiers in all the nodes are conducted at the same time, as to the gain setting of each span, the gain setting can not be conducted when the gain setting for the previous span has not yet been completed if there a through light from the previous node. Therefore, as a result, each gain setting is completed one after another from the node where a wavelength λ is inserted (ADDED). An example of a ring network is shown in FIG. 5.

In FIG. 5, nodes 1 to 6 are structured to connect as a ring. When a wavelength λ 1 is inserted (ADDED) from the node 1 and passes through from the node 2 to the node 5 and is divided (DROP) at the node 6, if the gain setting for the node 1 to 6 are started at the same time, the pre-amplifier 201 at the node 2 waits for the output stabilizing bits from the post-amplifier 105 at the node 1 and the post-amplifier 205 at the node 2 can not send the output stabilizing bits because the optical output level from the pre-amplifier 201 is less than one (1) wave level or is not stable.

Likewise in turn, at the node 3 to the node 6, pre-amplifiers 302 to 602 and post-amplifiers 305 to 605 are subject to the stabilization of the output of the post-amplifier at the previous node.

Gain setting triggers of the pre-amplifiers 102 to 602 conduct the gain setting after the pre-amplifiers are mounted on a shelf and in-service setting is completed when the pre-amplifiers automatically monitor the output stabilizing bits from the post-amplifiers in each of the previous node and confirms that the bits are stable. In other words, the post-amplifier at the previous node does not have a structure in which when the pre-amplifier in the next stage conducts the gain setting is not recognized.

Summarizing above, in the conventional apparatus, when a pre-amplifier conducts a gain setting in the ALC mode, the input level and the output level of the pre-amplifier are monitored and the difference between them are obtained as a gain. However, because conducting the gain setting is not possible when the input level to the pre-amplifier is less than that of one (1) wave, there is a problem that conducting a gain setting of a pre-amplifier is impossible at zero (0)-wave span.

If conducting the gain setting of pre-amplifier is impossible at a zero (0)-wave span, there is a problem that, when an OSPPR (Optical Shared Path Protection RING) service channel (for example, the line constituted of nodes N1 to N5 in FIG. 6A) is switched to a protection path (the line constituted of the node N1, N8, N7, N6 and N5 in FIG. 6A) as shown in FIG. 6, the requirement of the protection switching time (within 50 ms) can not be satisfied because the gain setting of amplifiers in the path is started at the time of the above switching.

In order to solve the above problems, a structure has been suggested in which a light containing one or more waves always exist in each span in the RING by holding an OUPSR (Optical Unidirectional Path Switched RING) of one (1) or more wave in the RING or by bridging ADD light of OSPPR (Optical Shared Path Protection Ring) shown in FIG. 6B and, therefore, passing a light through the protection path. However, the above suggestion leaves a problem that the structure must impose some restrictions for system operation on the customers.

It is also considered to provide a light source in the post-amplifier unit and to use this light source when conducting the gain setting of the pre-amplifiers in zero (0)-wave spans. However, this leaves a problem that it results in an increased mounting area on the unit and an increased cost of the light source and the switching device.

SUMMARY OF THE INVENTION

In terms of these points, the inventors, after consideration, have found that it is possible to utilize actively for the gain setting of amplifiers the ASE light that is not preferable for the conventional optical transmission system and has been disposed employing the measures for reducing it.

It is therefore the object of the present invention to provide a method of setting the gain of a pre-amplifier utilizing ASE light in a WDM optical transmission apparatus utilizing the ASE light, as well as to provide the WDM optical transmission apparatus to which the method is applied.

In order to achieve the above object, according to a first aspect of the present invention there is provided a WDM optical transmission apparatus disposed at a node of a ring network or of an open ring network, comprising a pre-amplifier having two control modes consisting of ALC mode in which the gain of an optical amplifier is controlled such that the total output of the optical amplifier is constant for a multiplexed wavelength number n, and of AGC mode which is a control mode maintaining constant the ratio of an optical input level to an optical output level for the multiplexed wavelength number n; and a post-amplifier having two control modes consisting of ASE mode in which the gain of the post-amplifier is set higher than that in the AGC mode and is set such that the output level of ASE light corresponds to the multiplexed wavelength number n, and of the AGC mode; and in the ASE mode, the gain of the pre-amplifier in the WDM optical transmission apparatus at the next node is set under an ALC control utilizing ASE light output from the post-amplifier.

Preferably, the WDM optical transmission apparatus further comprises a first coupler for multiplexing an optical monitoring signal on a wavelength multiplexing signal output from the post-amplifier; a second coupler for multiplexing a C-band wavelength multiplexing signal and an L-band; a first splitter for separating a C-band WDM signal input from a previous node and an L-band wavelength multiplexing signal; and a second splitter for separating the OSC signal input from the previous node; the ASE light output level is adjusted such that an optical level obtained by subtracting an optical level of the wavelength bandwidth blocked by the first splitter and the second splitter in the pre-amplifier from the ASE optical output level output from the post-amplifier at the node in a previous stage corresponds to the optical level of n waves; and the pre-amplifier receives the wavelength multiplexing signal of the wavelength number n from a post-amplifier at the previous node and conducts the gain setting of the pre-amplifier utilizing ASE light of the wavelength multiplexing signal.

By virtue of the above structure, it is possible to conduct a gain setting of the pre-amplifier at the next node at the so-called zero (0)-wave span where there is no wavelength λ in the span or at the span including one (1) or more waves. It is also possible to provide a WDM apparatus which can immediately start the service in the active path even when a switching has occurred in the protection path from the work path in the RING passing through this span because the gain setting of the pre-amplifiers has been completed. In addition, it is possible to conduct a gain setting of the pre-amplifier at the next node using a current post-amplifier without providing any new light source for the gain setting of the pre-amplifier at the zero (0)-wave span and it is further possible to eliminate any gain setting errors caused by cutting the ASE light level bandwidth by a C/L splitter and an OSC splitter when conducting a gain setting of the amplifiers utilizing an ASE light.

preferably, the WDM optical transmission apparatus further comprises a shutter for blocking a wavelength multiplexing signal input to the post-amplifier; and an optical surge output from the post-amplifier is prevented by closing the shutter such that the wavelength multiplexing signal is not input to the post-amplifier when the mode of the post-amplifier is shifted to ASE mode and opening the shutter such that the wavelength multiplexing signal is input to the post-amplifier after shifting of the mode of the post-amplifier to the AGC mode.

According to the above structure, because of the arrangement of a WDM shutter, it is possible to prevent the optical surge from the post-amplifiers in the ASE mode and to prevent the optical devices such as optical level monitor sections in the post-amplifiers and input light monitor section of the pre-amplifier at the next node from being broken.

In order to attain the above object of the present invention according to a second aspect of the present invention there is provided a method of setting the gain of a pre-amplifier of a WDM optical transmission apparatus having the pre-amplifier and a post-amplifier and placed at a node of a ring network or of an open ring network, the method comprising the steps of, for the pre-amplifier, setting two control modes consisting of ALC mode in which the gain of an optical amplifier is controlled such that the total output of the optical amplifier is constant with respect to the multiplexing wavelength number n and of AGC mode that is a control mode for maintaining constant the ratio of an optical input level to an output optical level; setting two control modes consisting of ASE mode in which the gain of the post-amplifier is set higher than that in the AGC mode and is set such that the output level of an ASE light corresponds to the multiplexing wavelength number n, and of AGC mode; and in the ASE mode, outputting the ASE light of the post-amplifier and setting the gain of the pre-amplifier in the WDM optical transmission apparatus at the next node under the ALC control utilizing the ASE light.

By virtue of the above structure, it is not necessary to notify the number of the wavelengths and post-amplifier output level information from the post-amplifier to the pre-amplifier because the gain setting is conducted only with a post-amplifier ASE output light that is always at a constant level. As a result, the interface and the sequence relating to the activation of the amplifiers are simplified and effects are given positively to reduction of the time for activation and the costs.

Preferably, the method of setting the gain of a pre-amplifier of a WDM optical transmission apparatus further comprises the steps of providing a shutter for blocking the input of a wavelength multiplexing signal on the input side of the post-amplifier; and closing the shutter such that the wavelength multiplexing signal is not input to the post-amplifier when the gain setting of the pre-amplifier at the next node is conducted utilizing the ASE light, and outputting only ASE light at a constant level at all times from the post-amplifier so as to allow the gain setting of the pre-amplifier to be conducted only by the ASE output light at all times.

By virtue of the above structure in which such shutters are provided, it is possible to conduct a gain setting of the pre-amplifiers only within the single span to be activated and make the quality of the service higher without influencing on the other spans in the service network than the one to be activated and without disconnecting the service channel in the service network.

Preferably, the method of setting the gain of a pre-amplifier of a WDM optical transmission apparatus further comprises the steps of allowing the shutter to block through light and add light at a node in the ring network or the open ring network; with the shutter being blocked, sending channel alarm information to a downstream node; and in only a corresponding span, conducting the gain setting of a pre-amplifier at the next node by the ASE light of the post-amplifier.

Preferably, in the method of setting the gain of a pre-amplifier of a WDM optical transmission apparatus, ASE Request bit is sent as an ASE light output request to the post-amplifier section at the previous node when the gain setting of a pre-amplifier is necessary, and the post-amplifier section closes the WDM shutter and shifts to the ASE mode after the post-amplifier section has received the ASE light output request; and the post-amplifier section notifies the pre-amplifier at the next node needing the gain setting of the pre-amplifier of ASE light output stabilization information at the moment when the ASE light output becomes stable, the post-amplifier section giving a permission to start the gain setting in ALC mode to the pre-amplifier section; and the pre-amplifier conducts the gain setting in ALC mode utilizing the ASE light after the pre-amplifier has received the ASE light output stabilization information from the post-amplifier of the post-amplifier section at the previous node, the pre-amplifier thereafter shifting to AGC mode and ceasing sending the ASE light output request to the post-amplifier section at the previous node; and in the post-amplifier section at the previous node, the post-amplifier shifts to the AGC mode at the time when the ASE light output request ceases to be received, to open the WDM shutter and cease notifying the pre-amplifier at the next node of the ASE light output stability information.

By virtue of the above structure, it is possible to set the pre-amplifier into a state where it can always be on service without any operator because the gain setting of the pre-amplifiers can be completed automatically utilizing the ASE light of a post-amplifier. For example, the above structure has an advantage that a pre-amplifier can automatically start servicing even when recovering from a power shut down or after a replacement of the pre-amplifier unit.

Preferably, in the method of setting the gain of a pre-amplifier of a WDM optical transmission apparatus, the gain setting is conducted when the unit mounted with the pre-amplifier is replaced with another.

Therefore, the invention has an advantage that it is possible to complete automatically the gain setting of the pre-amplifier after replacing the pre-amplifier unit even when the span has zero (0) wave or has one (1) or more waves and, therefore, the operator can recover the service as conducted before the replacement of the pre-amplifier only by replacing the unit.

Preferably, in the method of setting the gain of a pre-amplifier of a WDM optical transmission apparatus, after recovery from an APSD (Automatic Power Shut Down) in a span, a pre-amplifier section in the span detects the recovery from the APSD, sends an ASE request to the post-amplifier at the previous node and conducts again the gain setting of the pre-amplifier.

By virtue of the above structure, it is possible to complete automatically the gain setting of the pre-amplifier after the recovery of an APSD in a span when the span has zero (0) wave or has one (1) or more waves. The examples of factors causing the APSD are a fiber breaking and a replacement of a post-amplifier. However, the invention has an advantage that the service conducted before the occurrence of the APSD can be automatically recovered from after the fiber breaking has been recovered or after the replacement of the post-amplifier.

Preferably, in the method of setting the gain of a pre-amplifier of a WDM optical transmission apparatus, after one node has recovered from a power shut down, the pre-amplifier at the node sends an ASE request to the post-amplifier at the previous node and conducts again the gain setting of the pre-amplifier.

By virtue of the above structure, the invention has an advantage that, after recovering from a power shut down at a node, the gain setting of the pre-amplifiers can be automatically completed in the spans previous and next to the node if the spans have zero (0) wave or have one (1) or more waves and the operator can recover the service as conducted before the power shut down has occurred without doing anything.

Preferably, the method of setting the gain of a pre-amplifier of a WDM optical transmission apparatus further comprises the steps of setting the post-amplifier to the ASE mode, to allow ASE light to be sent out to conduct the gain setting in the ACL mode at the pre-amplifier at the next node; and in a span having a multiplexed wavelength of one (1) or more waves, setting the post-amplifier to the AGC mode, to conduct the gain setting of the pre-amplifier at the next node in ALC mode utilizing output light of the post-amplifier.

By virtue of the above eighth aspect of the invention, it is possible to conduct the gain setting of the pre-amplifier in the conventional post-amplifier AGC mode and pre-amplifier ALC mode in a span having one (1) or more waves and it is also possible to conduct the gain setting of the pre-amplifier at the next node using an existing post-amplifier without providing any new light source for gain setting of the pre-amplifier in the zero (0)-wave span. As a result, it is possible to upgrade the functions of the apparatus without increasing the costs and it is also possible to start the service in an active path even when a switching from a work path in the RING to the protection path passing through this span has occurred.

Preferably, the method of setting the gain of a pre-amplifier of a WDM optical transmission apparatus further comprises the steps of, regardless of the input wavelength number to the post-amplifier section, closing the WDM shutter of the post-amplifier section, setting the post-amplifier to the ASE mode to allow ASE light to be output, and setting the post-amplifier at the next node to ALC mode; and conducting the gain setting of the pre-amplifier using the ASE light.

By virtue of the above ninth aspect of the invention, it is possible to conduct the gain setting of the pre-amplifier at the next node in a single activation method using the existing post-amplifier by only adding a WDM shutter in a span having zero (0) wave or having one (1) or more waves. Furthermore, the repetition of the activation sequence caused by the variation of the input level can be prevented by blocking the input to a post-amplifier by a WDM shutter. As a result, the invention has an advantage that the interface and the sequence relating to the activation of an amplifier can be simplified and, therefore, the activation time can be reduced.

Preferably, in the method of setting the gain of a pre-amplifier of a WDM optical transmission apparatus, when all the nodes are activated during the recovery from a power shut down of the entire ring network or the entire open ring network, the pre-amplifier at each node sends an ASE request to the post-amplifier at each previous node, the WDM shutter being closed in the post-amplifier section in each node to allow all the spans to be independent from each other; and each span conducts in parallel the gain setting of a pre-amplifier.

By virtue of the above tenth aspect of the invention, because each span is isolated by the WDM shutters and the gain setting of the pre-amplifier in a span is completed separately, it is possible to considerably reduce the activation time comparing to the conventional method in which the amplifiers are activated separately in each node when all the nodes are activated at the same time in a ring network, etc.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Figure 4:
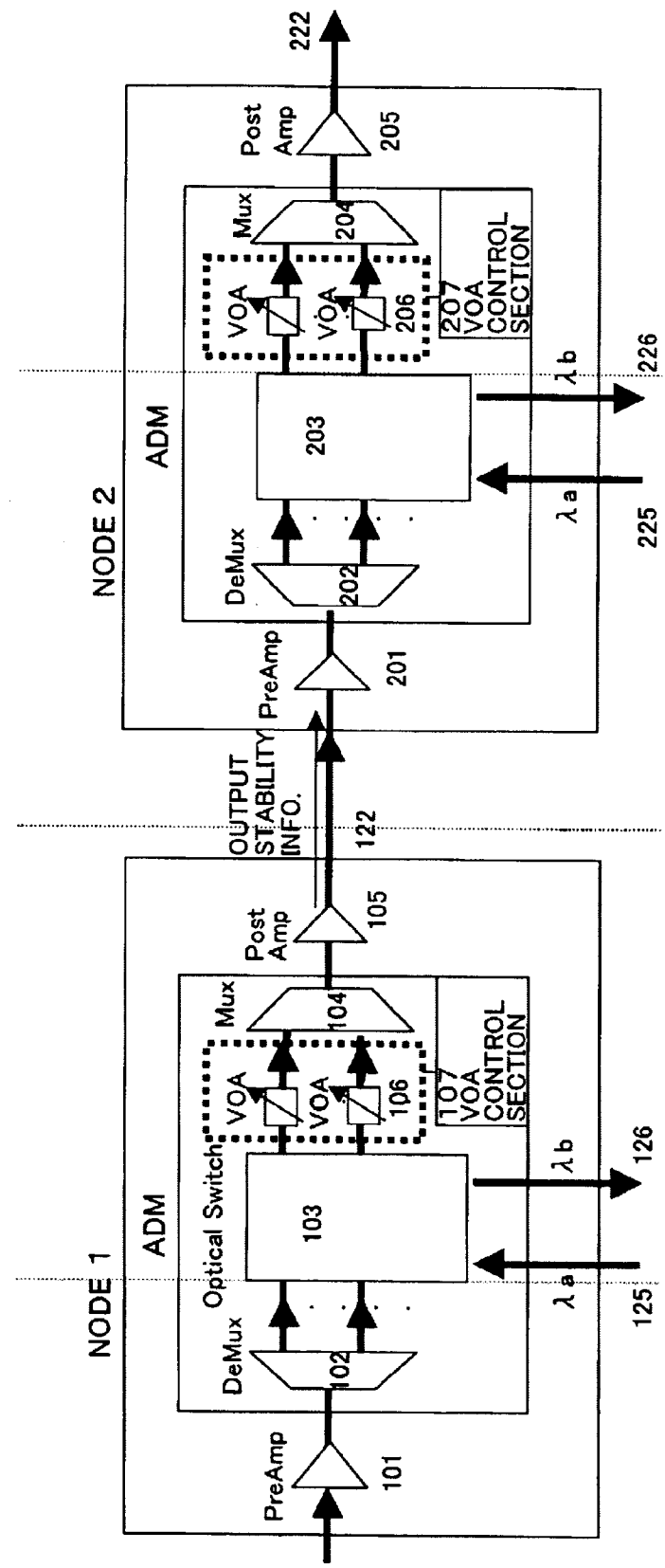
FIG. 4 illustrates the relation between a node 1 and a node 2 connected to each other through an optical transmission path 122.
Figure 7:
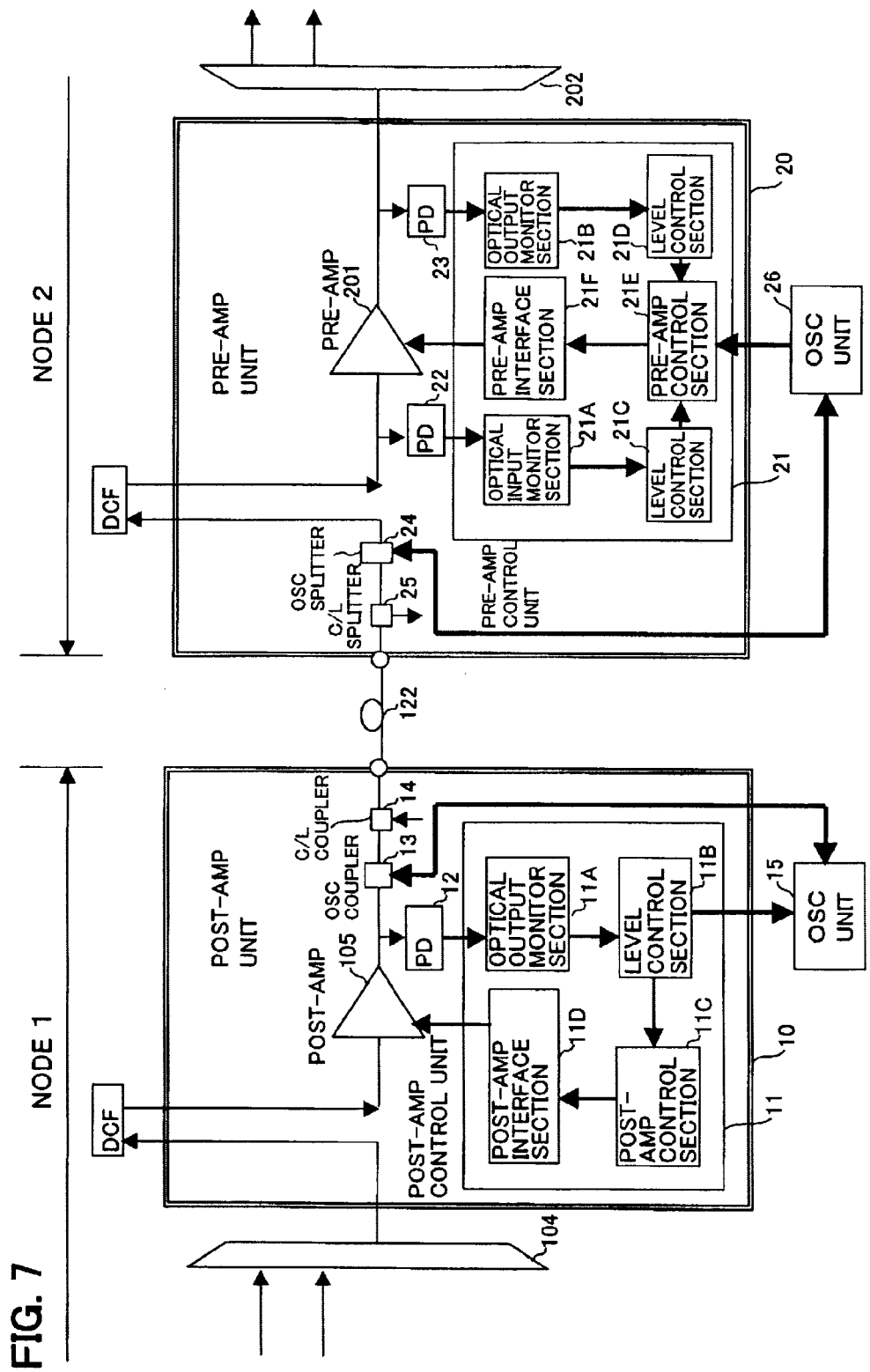
FIG. 7 the functions according to the invention of a WDM transmission apparatus according to the invention utilizing an ASE light.

Embodiments of the invention will now be described with reference to the drawings. FIG. 7 illustrates the functions according to the invention of a WDM transmission apparatus according to the invention utilizing an ASE light in terms of the relation between the node 1 and the node 2 like FIG. 4.

In FIG. 7, the node 1 side and the node 2 side are connected to each other by the optical transmission path 122. On the node 1 side, the components before the wavelength multiplexing apparatus 104 are not shown. Likewise, on the node 2 side, the components after a wavelength demultiplexing apparatus 202 are not shown.

On the node 1 side, a post-amplifier unit 10 has the post-amplifier 105 and a post-amplifier control unit 11 for controlling the post-amplifier 105. On the node 2 side, a pre-amplifier unit 20 has the pre-amplifier 201 and a pre-amplifier control unit 21 for controlling the pre-amplifier 201.

A WDM optical signal wavelength-multiplexed by the wavelength multiplexing apparatus 104 inputs a WDM signal to the post-amplifier through a wavelength dispersion compensation fiber DCF to compensate an optical transmission path loss. The post-amplifier 105 has two (2) modes of AGC mode and ASE mode.

Now, in the invention, ASE (Amplified Spontaneous Emission) mode means to set the gain of an amplifier higher than that of AGC mode and to set the output level of an ASE light such that it corresponds to that of n waves.

When the WDM signal from wavelength multiplexing apparatus 104 has zero (0) wave, the post-amplifier 105 is set in the ASE mode at the post-amplifier control unit 11 in response to the ASE output request from the pre-amplifier at the next node. In this case, the level of ASE light corresponding to n waves set higher than the AGC mode at a level control section 11B is calculated.

On the other hand, the output light of the post-amplifier 105 is converted into an electric signal by a photoreceptor device 12 and the electric signal is input into an optical output monitor section 11A of the post-amplifier control unit 11.

The optical output monitor section 11A detects the ASE light output level from the post-amplifier 105 and compares this detected level with the level of ASE light corresponding to the n waves calculated at the level control section 11B. The differential value of the result of the comparison is fed back to a post-amplifier control section 11C.

The post-amplifier control section 11C controls the gain of the post-amplifier 105 using a post-amplifier interface section 11D such that the differential value becomes zero (0) obtained by the comparison of the detected level of the ASE light and the predetermined level.

According to the above structure, an ASE light corresponding to the level of n waves can be output even when the level of the input light to the post-amplifier 105 is that of zero (0) wave or less.

Such n-wave information is sent from the level control section 11B to an OSC unit 15 and is superimposed on an OSC signal in the OSC unit 15. The OSC signal from the OSC unit 15 is coupled with the ASE light of the post-amplifier at an OSC coupler 13 and is sent to the node 2 side.

A C/L coupler 14 shown within the post-amplifier unit 10 is a coupler coupling a C band and an L-band and, in FIG. 7, when the output of the OSC coupler 13 is a WDM signal in the C band, the coupler couples this WDM signal with a WDM signal in the L-band from a post-amplifier unit (not shown) supporting the L-band.

On the other hand, the pre-amplifier unit 20 has an OSC splitter 24 and C/L splitter 25 corresponding respectively to the OSC coupler 13 and C/L coupler 14 in the post-amplifier unit 10.

First, the pre-amplifier 201 is set into the ALC mode. In this setting, an OSC signal inserted on the node 1 side is demultiplexed by the OSC splitter 24 and is sent to an OSC unit 26. The n-wave information in the ASE mode set by the post-amplifier 105 is extracted from the OSC signal in the OSC unit 26. This extracted n-wave information is sent to a pre-amplifier control section 21E.

The attained level of the ASE light corresponding to (the targeted attained level per one wave)×n is calculated in the pre-amplifier control section 21E.

In the ALC mode, the output of the pre-amplifier 201 is converted into an electric signal in a photoreceptor device 23 and is detected by an optical output monitor section 21B. Then, the attained level of the ASE light received by a level control section 21D is detected.

Then, the attained level of the ASE light detected by the level control section 21D is compared with the attained level of the ASE light corresponding to (the targeted attained level per one wave)×n, calculated previously in the pre-amplifier control section 21E. The gain of the pre-amplifier 201 is set through the pre-amplifier interface section 21F such that the differential value as the result of the comparison becomes zero (0).

Therefore, according to the invention, it is possible to set the gain of the pre-amplifier 201 if the WDM signal input to the post-amplifier 105 becomes zero (0)-wave when recovering from a failure or activating a system.

Thus, it is possible to set the gain of the pre-amplifier at the next node without providing any new light source for setting the gain of the pre-amplifier even in a so-called zero (0)-wave span meaning there is no wavelength in the span.

Figure 8A:
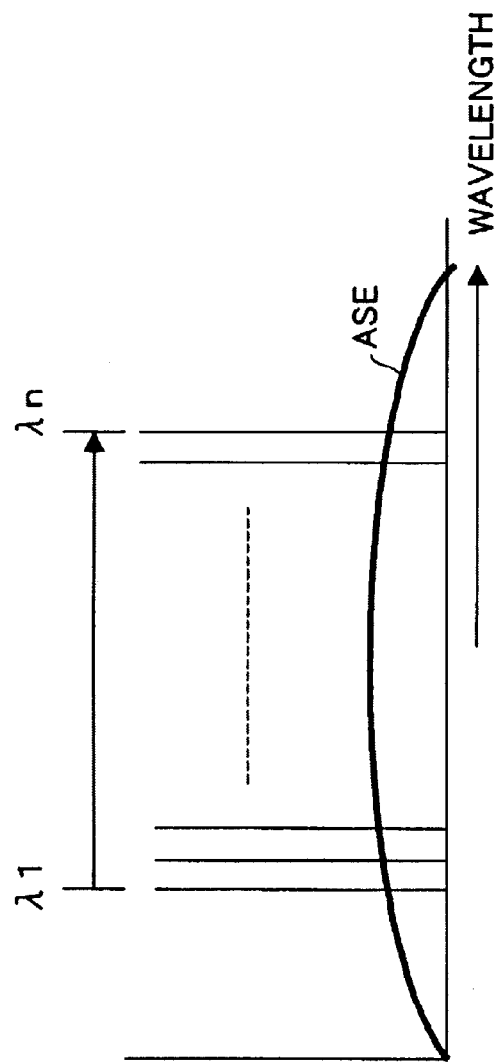
FIG. 8 illustrates that the level of an ASE light deleted or attained when passing through the OSC splitter 24 and the C/L splitter 25 is attenuated.
Figure 8B:
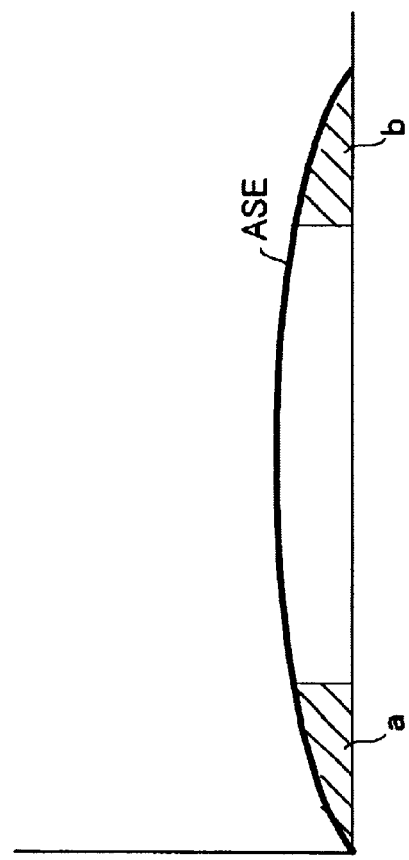

In the pre-amplifier unit shown in FIG. 7, a portion of the band contained in the ASE light sent from the node 1 side is eliminated when the ASE light passes through the OSC splitter 24 and the C/L splitter 25 placed on the input side of the pre-amplifier 201. FIG. 8 illustrates this. FIG. 8A shows a WDM signal in which n waves exist and the level of the ASE light.

The regions "a", "b" not being the n-wave band of the ASE light (see FIG. 8B) are eliminated when the ASE light passes through the OSC splitter 24 and C/L splitter 25. Thus, the level of the ASE light to be attained is attenuated and its relation with the n-wave information sent from the node 1 by the OSC signal described above can not be maintained.

Then, as an embodiment in application of the invention, when calculating in the level control section 11B the level of the ASE light corresponding to that of n waves, the value obtained by subtracting the optical level of the wavelength bandwidth eliminated when passing through the OSC splitter 24 and the C/L splitter 25 is superimposed on the OSC signal as the targeted attained level corresponding to that of n wavelengths and is sent to the next node 2. Therefore, the problems attributed to the elimination of a portion of the band of the ASE light conducted when the light passes through the OSC splitter 24 and the C/L splitter 25 can be solved.

Furthermore, when the pre-amplifier 201 is set into the AGC mode, the optical input level on the input side of the pre-amplifier 201 is converted into an electric signal by a photoreceptor device 22, the optical level is detected by a optical monitor section 21A and the signal is input to a level control section 21D.

The pre-amplifier control section 21E controls the gain of the pre-amplifier 201 such that the difference between the differential optical level of the optical levels captured by both of the level control sections 21C, 21D and the targeted optical level maintained by the pre-amplifier control section 21E becomes zero (0).

Therefore, the gain ratio of the input side and the output side is maintained constant in the AGC mode.

In a state where the post-amplifier 105 is set into the ASE mode as described above and the gain is brought high, the output level of the post-amplifier 105 may vary and an optical surge may occur when the input to the post-amplifier varies rapidly.

In such a case, the photoreceptor device 12 for the output level monitor of the post-amplifier 105 or the photoreceptor device 22 on the input side of the pre-amplifier 201 at the next node may be broken.

Figure 9:
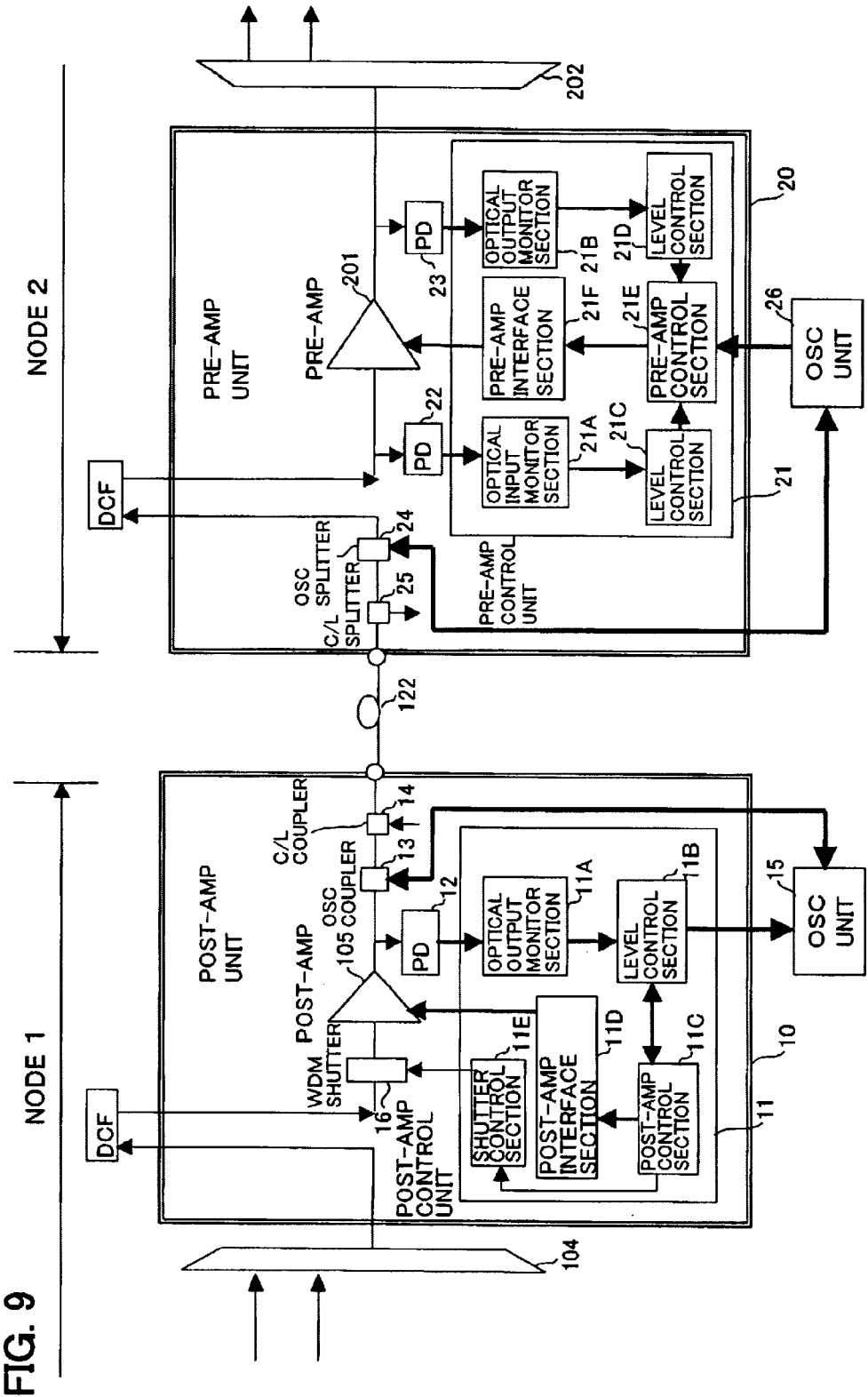
FIG. 9 illustrates an embodiment according to the invention that solves the drawback that the photoreceptor is broken by an optical surge in the ASE mode.

An embodiment according to the invention that solves the above problems is shown in FIG. 9. The embodiment in FIG. 9 is characterized in that a WDM shutter 16 on the input side of the post-amplifier 105 for blocking the WDM signal is further provided to the embodiment shown in FIG. 7.

Before the post-amplifier 105 is set into the ASE mode, a request for shutting the WDM shutter 16 is sent from the post-amplifier control section 11C to a shutter control section 11E.

Then, after the post-amplifier 105 is set into the AGC mode by the post-amplifier control section 11C, a request of opening the WDM shutter is sent to the WDM shutter control section 11E.

Therefore, an optical surge from the post-amplifier 105 can be prevented because the WDM shutter 16 is always closed while the post-amplifier is in the ASE mode.

Further describing the operation of the embodiment shown in FIG. 9, a request for closing the WDM shutter 16 is sent to the WDM shutter control section 11E before the post-amplifier 105 is set in the ASE mode by the post-amplifier control section 11.

Then, the post-amplifier control section 11 sets the post-amplifier 105 into the ASE mode and sends a request for an ASE optical level setting to the level control section 11B. The level control section 11B adjusts the level such that the level of the ASE optical output of the post-amplifier 105 received from the optical output monitor section 11A attains the targeted level.

Furthermore, as described above relating to the embodiment shown in FIG. 7, the level obtained by subtracting the optical level cut by the OSC splitter 24 and the C/L splitter 25 in the pre-amplifier unit 20 at the next node 2 from the level of the ASE optical output of the post-amplifier 105 is, as a modification, when setting the system, predetermined as an ASE optical level sent out from the post-amplifier 105 at the previous node 1 to the pre-amplifier unit 20 at the next node 2.

Therefore, it is not necessary to notify of the number of the wavelengths and the output level information of the post-amplifier 105 from the post-amplifier unit 10 at the node 1 to the pre-amplifier unit at the next node 2.

Furthermore, an example of the procedure enabling a gain setting of the pre-amplifier 201 in the in-service network by the control of opening and closing of the WDM shutter 16 in the structure shown in FIG. 9 will be described.

Figure 1:
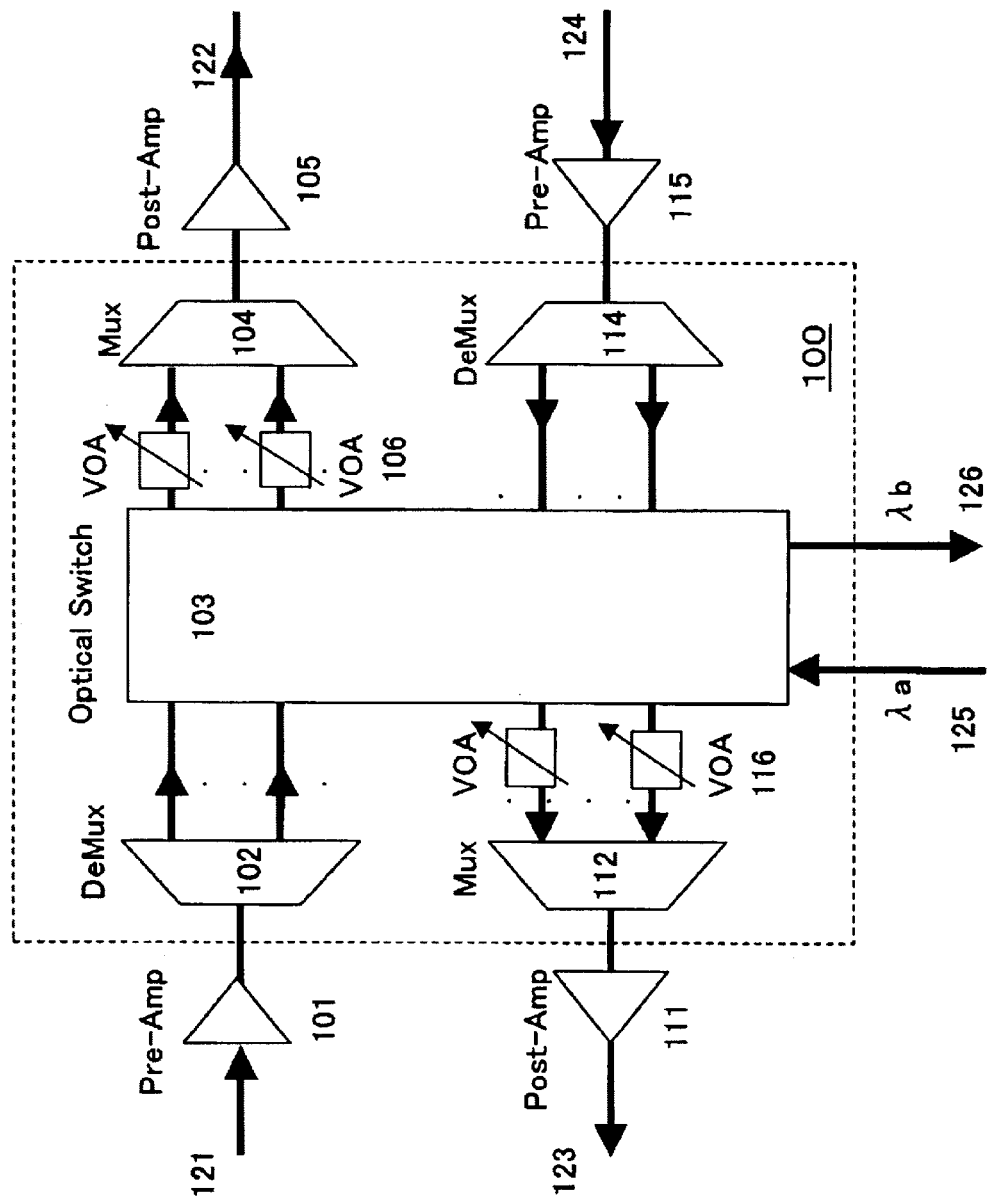
FIG. 1 illustrates an example of the structure of a WDM transmission apparatus placed in each node in a network.
Figure 2A:
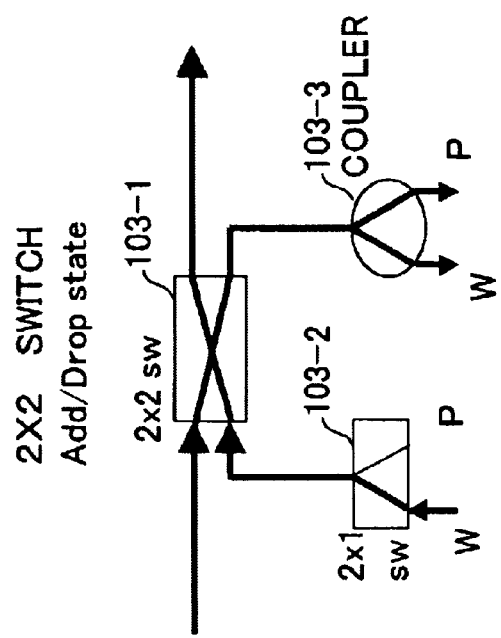
FIG. 2 illustrates a schematic view of the function of an optical switch unit.
Figure 2B:
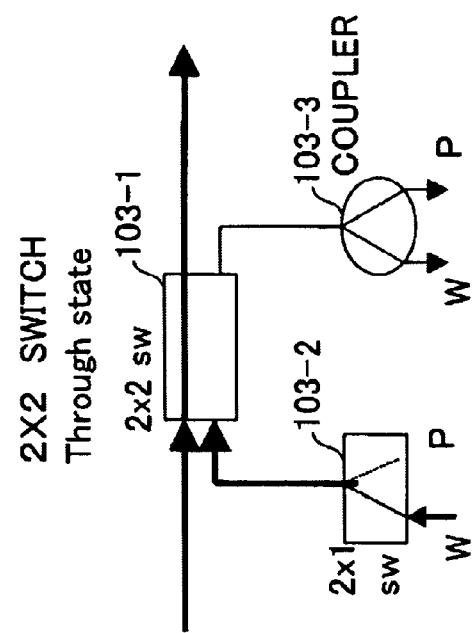
Figure 3:
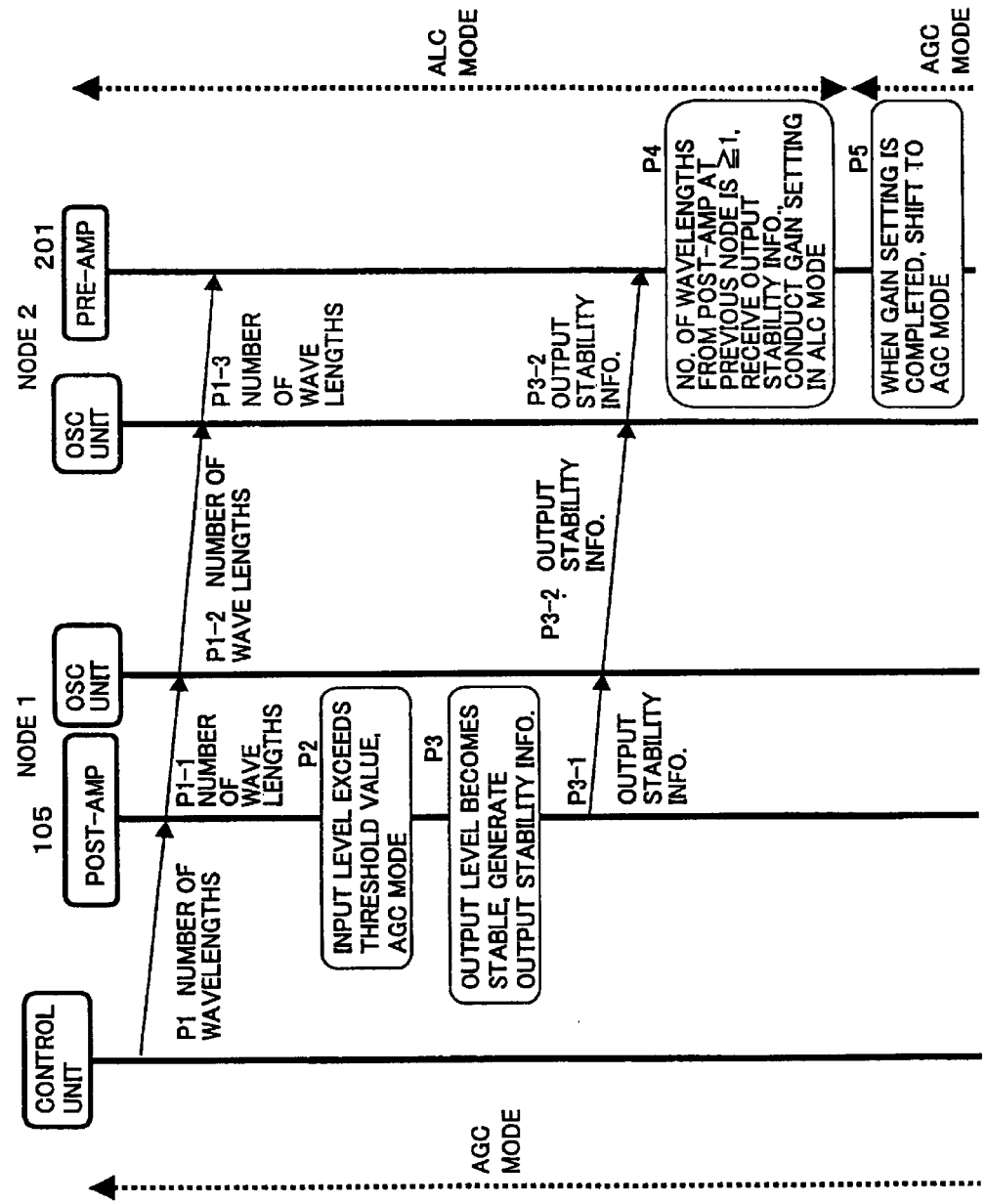
FIG. 3 illustrates a sequence of a pre-amplifier gain setting in a conventional apparatus.
Figure 5:
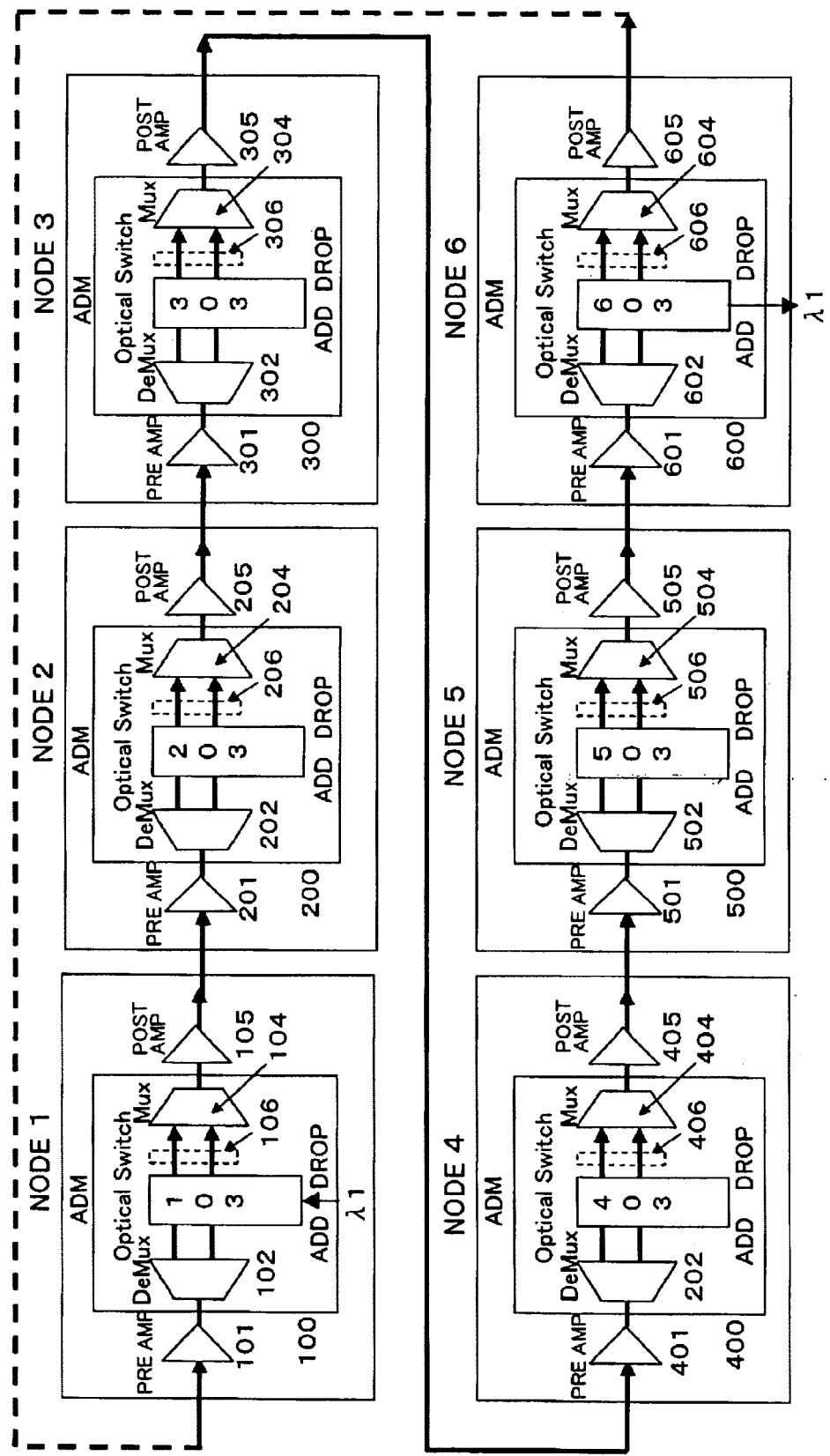
FIG. 5 illustrates an example of a ring network.
Figure 6A:
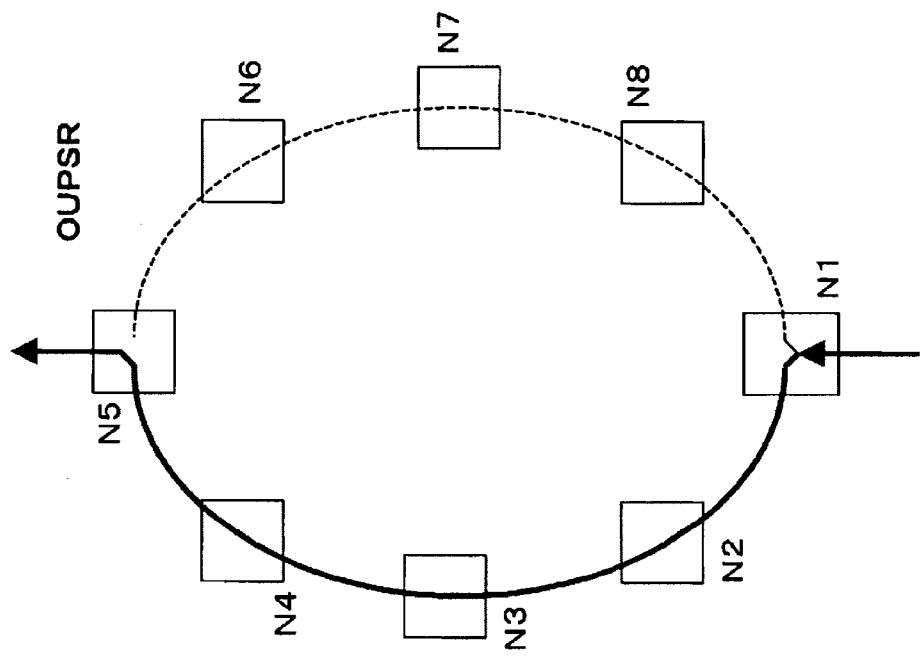
FIG. 6 illustrates an OUPSR and an OSPPR.
Figure 6B:
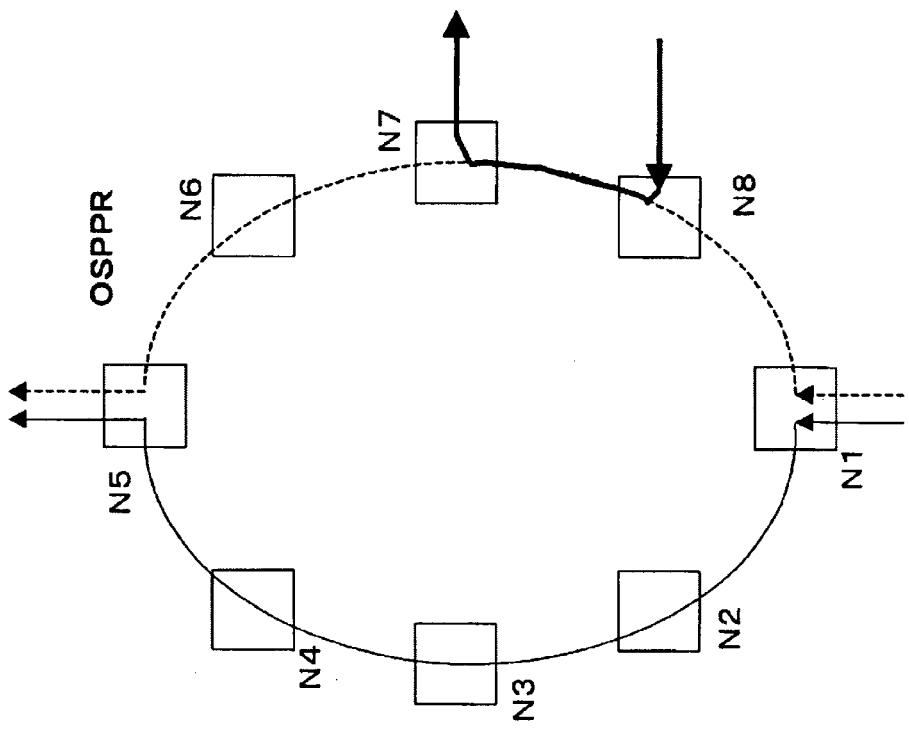

In WDM transmission apparatus shown in FIG. 8, the WDM transmission apparatus mounted with a switch unit loaded with the 2×2 switch shown in FIG. 2 capable of adding/dropping each wavelength separately, takes a ring network structure or an open ring network structure as shown in FIG. 5 is considered.

When the gain setting of the pre-amplifier in one span in such a ring network or an open ring network is conducted, the WDM shutter control section 11E in the post-amplifier unit 20 in the span first notifies to the OSC unit 15 of the information that the WDM shutter has been closed.

In the OSC unit 15, a wavelength channel failure (WCF) to be sent out toward the next node is set for alarm for all the in-service (IS) wavelengths λ. Therefore, the wavelength λ passing through this span is switched to the auxiliary side (protection) path not shown in the figure. Next, the WDM shutter control section 11E closes the WDM shutter 16 and the pre-amplifier is activated in the method described relating to FIG. 7.

Then, the WDM shutter control section 11E opens the WDM shutter 16 and notifies to the OSC unit 15 of the information that the WDM shutter has been opened. The OSC unit 15 sets back the WCF to be sent toward the next node 2 to the normal setting.

According to the above method, it is possible to conduct a gain setting of the pre-amplifier 201 at the next node using an ASE light of the post-amplifier 105 independently for the span without influencing the other spans and the service channels even in the in-service network.

Figure 10:
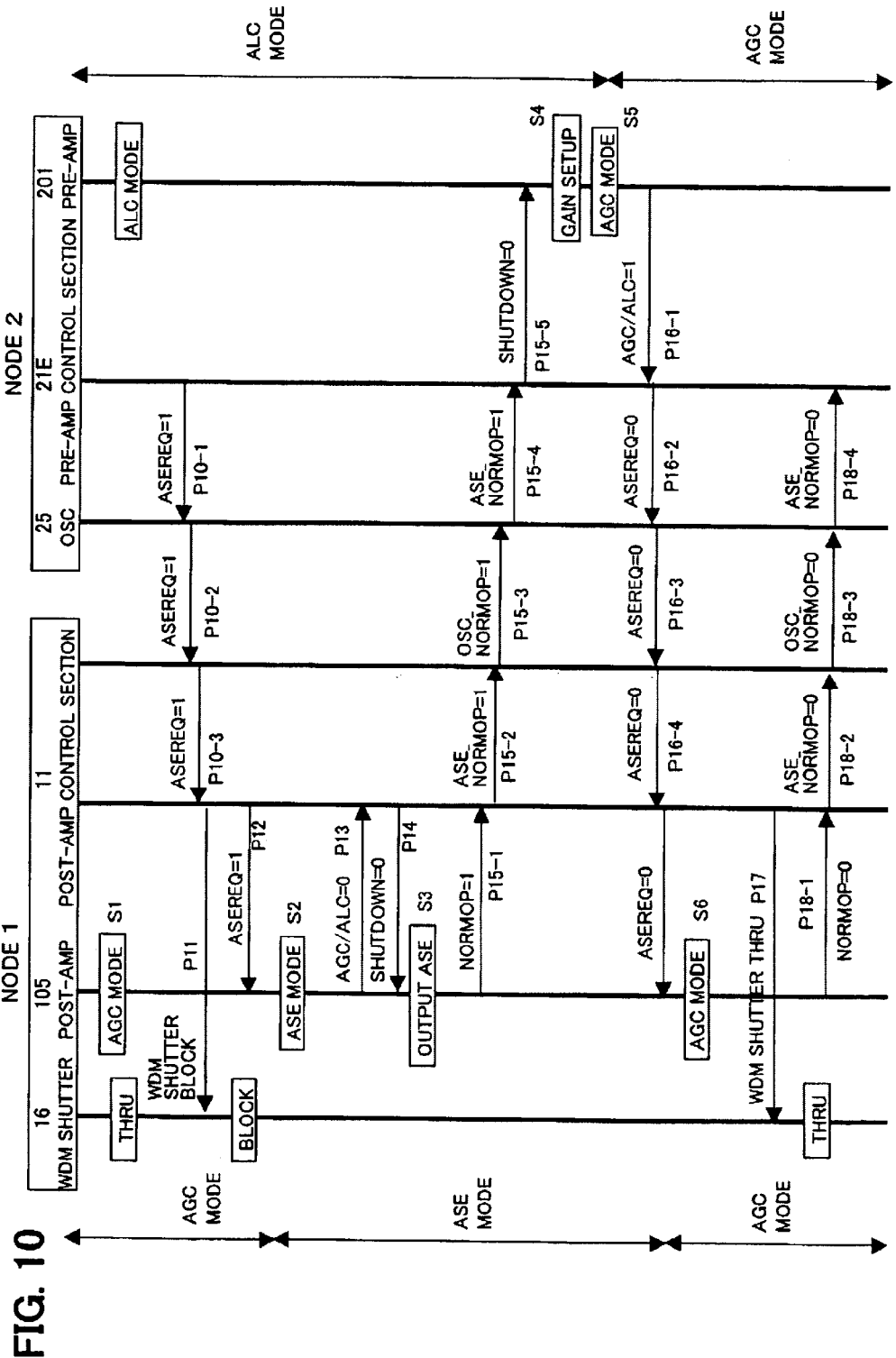
FIG. 10 illustrates the sequence flow showing the operational procedure in an embodiment.

FIG. 10 illustrates the sequence flow showing the operational procedure in the above embodiment.

In the WDM apparatus shown in FIG. 9, when the gain setting of the pre-amplifier 201 at the node 2 is necessary, a request for an ASE light output is sent from the pre-amplifier control section 21E through the OSC unit 26 to the post-amplifier control section 11C of the post-amplifier unit 10 at the previous node 1 (Process P10-1 to P10-3).

When the post-amplifier control section 11C at the node 1 receives the request for the ASE light output, it closes the WDM shutter 16 through the shutter control section 11E (Process P11). At the same time, an ASE mode setting is conducted to the post-amplifier 105 (Process P12). Therefore, the mode of the post-amplifier 105 shifts from the AGC mode (Step S1) to the ASE mode (Step S2).

The post-amplifier control section 11 monitors the ASE light output level through the photoreceptor device 12, the optical output monitor section 11A and the level control section 11B (Process P13). The output level is adjusted by controlling the gain of the post-amplifier 105 in response to the ASE light output level (Process P14).

At the time when the ASE light output level is stabilized (Step S3), the ASE light output stabilization information is notified to the pre-amplifier control section 21E at the next node 2 and a permission for starting the gain setting is given to the pre-amplifier 201 (Process P15-1 to P15-5).

The pre-amplifier 201 conducts the gain setting in ALC mode utilizing the ASE light from the node 1 when it receives the ASE light output stabilization information from the post-amplifier at the node 1 (Step S4).

When the gain setting has been conducted in ALC mode, the mode is shifted to the AGC mode (Step S5) and the transmission of the request for the ASE light output to the post-amplifier control section 11 at the node 1 is ceased (Process P16-1 to P16-4).

At the time when the post-amplifier control section 11 at the node 1 ceases to receive the request for the ASE light output, the post-amplifier 105 is set into the AGC mode and controlled (Process P17). Therefore, the mode of the post-amplifier 105 is shifted to the AGC mode (Step S6).

The post-amplifier control section 11 conducts a control for opening the WDM shutter 16 when the mode of the post-amplifier 105 is shifted to the AGC mode (Process P1). Therefore, the notification of the ASE light output stabilization information to the pre-amplifier control section 21E is ceased (Process P18-1 to P18-4).

According to the above sequence, the pre-amplifier 201 and the post-amplifier 105 can automatically complete the gain setting of the pre-amplifier 201 utilizing the ASE light.

Therefore, it is possible to conduct automatically the gain setting of the pre-amplifier 201 by utilizing the sequence shown in above FIG. 10 when the pre-amplifier unit 20 has been replaced. Thus, after replacing the pre-amplifier unit 20, it is possible to conduct automatically the gain setting of the pre-amplifier 201 even when the span has zero (0) wave or has one (1) or more waves.

Furthermore, it is possible for the pre-amplifier unit 20 in the span to detect the APSD recovery and to transmits the request for the ASE optical output to the post-amplifier control section 11C at the previous node 1 for automatically conducting the re-setting of the gain by utilizing the sequence shown in the above FIG. 10 after the recovery from an APSD (Automatic Power Shut Down) in a span.

Thus, after the recovery from the APSD in the span, the gain setting of the pre-amplifier 201 is completed automatically even when the span has zero (0) wave or has one (1) or more waves.

Furthermore, it is possible to complete the gain setting of the pre-amplifier 201 in the same procedure as described above by transmitting by the pre-amplifier of a certain node 2 to the post-amplifier control section 11E of the previous node 1 the request for sending out the ASE light when the node 2 has recovered from a power shut down, Yet furthermore, in the structure shown in FIG. 7 or FIG. 9, it is possible to monitor the number of wavelengths to be input to the post-amplifier by comparing it with the level for each number of wavelengths in the level control section 11B.

As a result of the monitoring of the number of wavelengths, the gain setting of the pre-amplifier 201 is conducted in the ASE mode when the number of wavelengths is zero (0) as described above. The gain setting of the pre-amplifier 201 is conducted utilizing an output light of the post-amplifier 105 output in the conventional AGC mode when the number of wavelengths is one (1) or more.

Thus, it is possible to conduct the gain setting of the pre-amplifier 201 of the next node using the existing post-amplifier 105 without providing any new light source for the gain setting of the pre-amplifier even in the so-called zero (0)-wave span where there is no wavelength λ in the span.

Furthermore, it is possible to conduct the gain setting of the pre-amplifier 201 in the conventional post-amplifier AGC mode or pre-amplifier ALC mode in the span having one (1) or more waves.

Furthermore, in the embodiment shown in the above FIG. 9 or FIG. 10, regardless of the number of the input wavelengths for the post-amplifier 105, in a span having zero (0) wave or one (1) or more waves, the WDM shutter 16 is closed by the post-amplifier control section 11, the post-amplifier 105 is set in the ASE mode and an ASE light is output.

Next, the pre-amplifier 201 at the node 2 is set into the ALC mode and it is possible to conduct the gain setting of the pre-amplifier 201 using ASE light. Thus, it is possible to conduct the gain setting of the pre-amplifier 201 of the next node 2 in a single activation method using the existing post-amplifier 105 only by adding the WDM shutter 16 even in a span having zero (0) wave or having one or more waves.

Now, an embodiment of the entire structure of the WDM apparatus unit and the flow of signals shown in FIG. 11 having the features described above will be described. FIG. 12 illustrates the operational sequence of the embodiment shown in FIG. 11.

Figure 11:
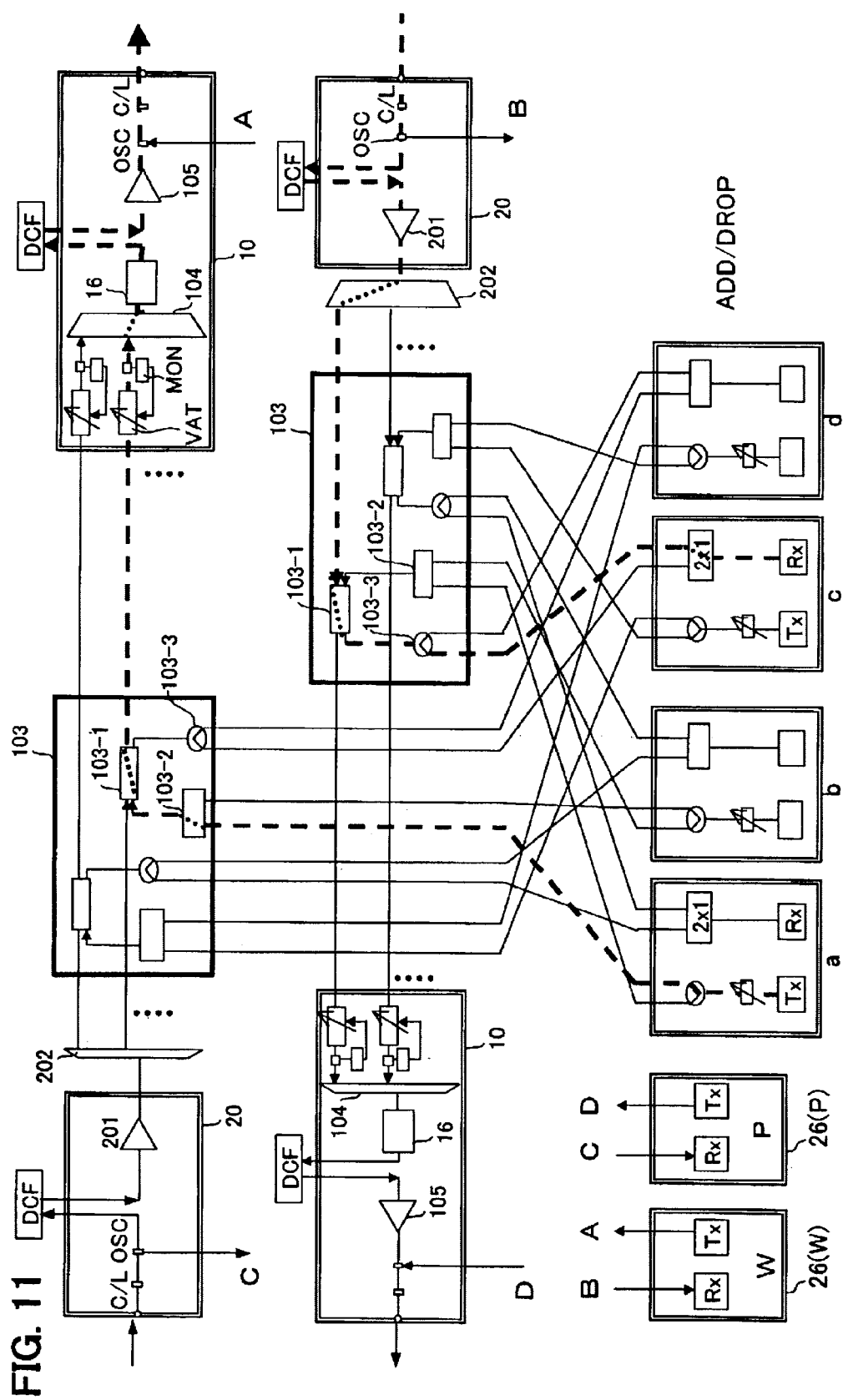
FIG. 11 illustrates an embodiment of the entire structure of the WDM apparatus unit and the flow of signals.
Figure 12:
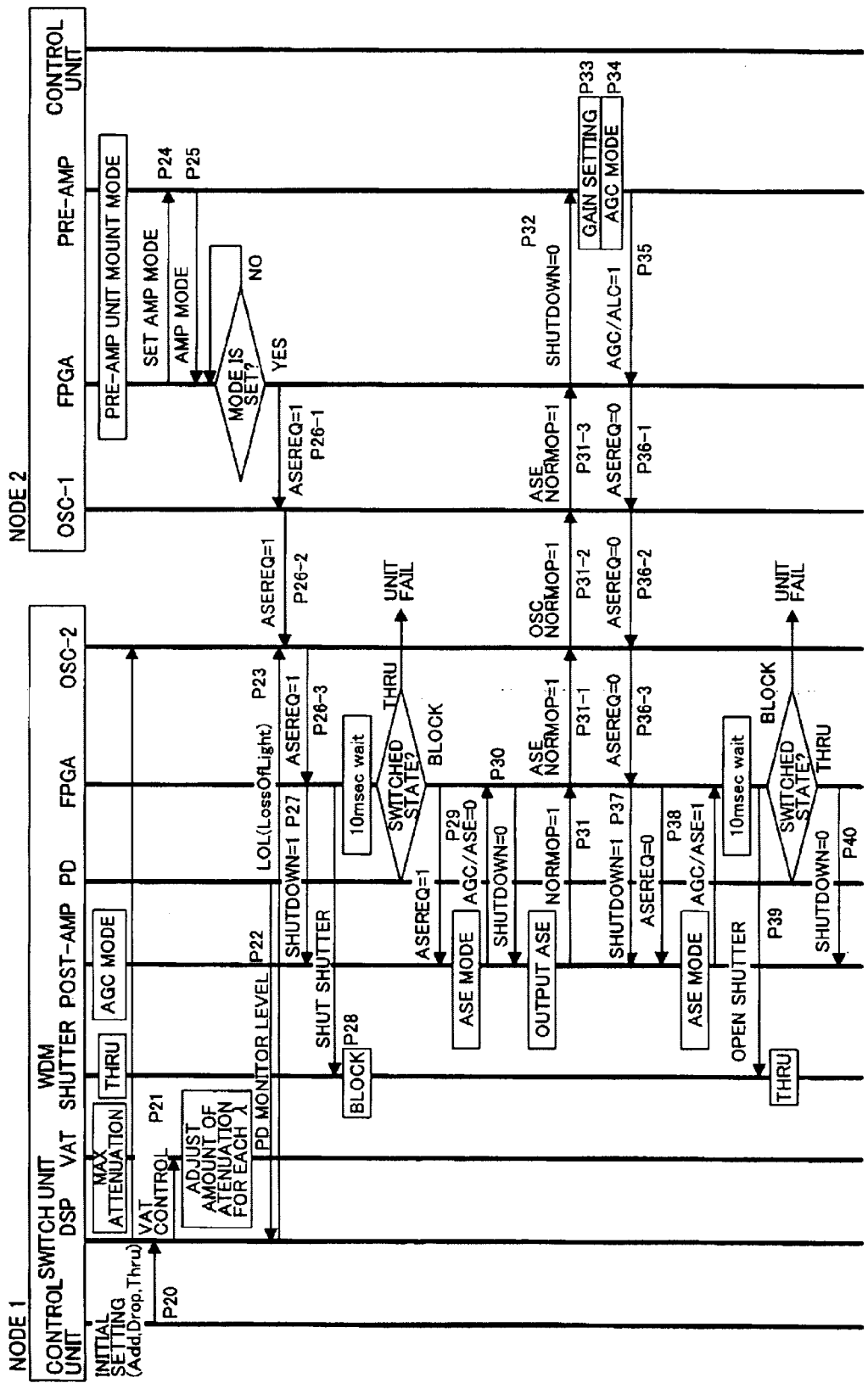
FIG. 12 illustrates the operational sequence of the embodiment shown in FIG. 11.

FIG. 11 illustrates the unit construction relating to bi-directional signals sent from EAST to WEST and from WEST to EAST.

In FIG. 11, DCF denotes a Dispersion Compensation Fiber that is a heavy-duty dispersion fiber for compensating for the accumulation of the positive dispersion in an optical transmission path. This DCF is inserted in the input section of a pre-amplifier or a post-amplifier when necessary.

VAT in the post-amplifier unit 10 is a Variable Attenuator for adjusting the optical level for each wavelength λ.

In the example shown in FIG. 11, the OSC unit 15 has an existing unit W and an auxiliary unit P. A state in which an optical switch unit 103 is set such that a signal is inserted toward EAST by an inserting/dividing (ADD/DROP) device "a" through the route indicated by the thick dotted line and a signal from EAST is divided by an inserting/dividing (ADD/DROP) "c".

In FIG. 12, DSP denotes a Digital Signal Processor for controlling the VAT in the post-amplifier unit 10. At the node 1, FPGA is the post-amplifier control unit 11 and, therefore, includes the level control section 11B and the post-amplifier control section 11C.

OSC-2 is the OSC unit 15 facing the OSC unit 26 (represented as OSC-1) at the node 2 being the next node and the control information between nodes (for example, a request for the ASE light and an OSC normal monitoring (NORMOP)) is transmitted using OSC paths.

FPGA at the node 2 corresponds to the pre-amplifier unit 21 that includes the level control section 21B and the pre-amplifier control section 21E of the pre-amplifier unit 20.

In FIG. 12, at the node 1, the previous node, the initial setting information (inserting: Add, dividing: Drop, through) is sent from the control unit 21 of the post-amplifier unit 20 to DSP and OSC-2 (both not shown) of the switch unit 103 (Process P20).

The DSP adjusts the VAT based on the service information of each of the wavelengths to adjust the amount of attenuation for each of the wavelengths (Process P21). Monitor level information is sent from the photoreceptor device (PD) 12 to the DSP of the switch unit 103 (Process P22). The DSP sends to the OSC-2 LOL (loss Of Light) information for the channels not having attained the necessary level of one wave for each of the wavelengths (Process P23).

The OSC-2 subtracts the number of wavelengths of LOL from the number of wavelengths to be sent to the OSC-1. This calculation is always conducted at the OSC-2.

At the node 2, the next node, the initial setting information is sent from the FPGA to the pre-amplifier 20 and the information of the number of wavelengths is always set at one (1) (NMBR=1) in the initial setting information (Process P24).

The pre-amplifier unit 20 sends to FPGA the response to the received amplifier mode. The FPGA sends the ASE light output request (ASEREQ 1) to the post-amplifier 105 at the node 1, the previous node, through the OSC-1 and OSC-2 when the pre-amplifier 201 is not down (AMP$_{\_ooM\_}$0) (Process P16-1 to P26-3).

The FPGA having received the ASE light output request sets the shutdown for the post-amplifier unit 10 (Process P27). Then, the FPGA sets the WDM shutter 16 to be shut (Block) (Process P28). After waiting for 10 ms, the FPGA confirms the position of the WDM shutter 16 and set the post-amplifier 105 in the ASE mode when the shutter 16 is correctly shut (Process P29).

The post-amplifier 105 notifies to the FPGA of the transition to the ASE mode and the FPGA releases the shutdown of the post-amplifier unit 10 (Process P30). The post-amplifier 105 outputs the ASE light and, when the output becomes stable, sends the ASE light output stabilization information (NORMOP=1) to the FPGA (Process P31).

The FPGA notifies the NORMOP information to the FPGA at the next node 2 through the OSC-2 and OSC-1 (Process P31-1 to P31-3) and releases the shutdown of the pre-amplifier unit 20 (Process P32).

The pre-amplifier 201 conducts the gain setting in the ALC mode (Process P33) and, after completing the gain setting, the mode of the amplifier 201 is shifted to the AGC mode (Process P34). The pre-amplifier unit 20 notifies the FPGA that the mode of the pre-amplifier has been shifted to the AGC mode (Process P35) and ceases transmitting the ASE light output request bits (ASEREQ=0) to the FPGA of the node 1, the previous node (Process P36-1 to P36-3).

Then, the FPGA shuts down the post-amplifier unit 10 (Process P37), sets it in the AGC mode and confirms that the post-amplifier 10 has been shifted to the AGC mode by AGC/ASE=1 (Process P38).

Having confirmed this, after 10 ms have passed, the FPGA sets the WDM shutter 16 to be opened (Process P39) and releases the shutdown of the post-amplifier 10 when the position of the switch is correctly at open (through) (Process P40).

At this moment, an AGC light is output from the post-amplifier 10 and a light output is obtained in the AGC mode at the pre-amplifier 201 at the next node. Thus, the activation of the pre-amplifier at the next node is completed using the ASE light of the post-amplifier 10.

As the embodiments have been described referring to the attached drawings, according to the invention, it is possible to conduct the gain setting of the pre-amplifier at the next node at the so-called zero (0)-wave span where there is no wavelength λ in the span or at the span having one (1) or more waves. It is further possible to provide a WDM apparatus capable of starting the service in the active path immediately even when a switching from a work path in the ring to the protection path passing through the span has occurred because the gain setting of the pre-amplifier has been completed.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A WDM optical transmission apparatus disposed at a node of a ring network or of an open ring network, comprising:

a pre-amplifier having two control modes consisting of ALC mode in which the gain of an optical amplifier is controlled such that the total output of the optical amplifier is constant for a multiplexed wavelength number n, and of AGC mode which is a control mode maintaining constant the ratio of an optical input level to an optical output level for the multiplexed wavelength number n; and a post-amplifier having two control modes consisting of ASE mode in which the gain of the post-amplifier is set higher than that in the AGC mode and is set such that the output level of ASE light corresponds to the multiplexed wavelength number n, and of the AGC mode; wherein in the ASE mode, the gain of the pre-amplifier in the WDM optical transmission apparatus at the next node is set under an ALC control utilizing ASE light output from the post-amplifier.

2. The WDM optical transmission apparatus according to claim 1, further comprising:

a first coupler for multiplexing an optical monitoring signal on a wavelength multiplexing signal output from the post-amplifier;

a second coupler for multiplexing a C-band wavelength multiplexing signal and an L-band;

a first splitter for separating a C-band WDM signal input from a previous node and an L-band wavelength multiplexing signal; and a second splitter for separating the OSC signal input from the previous node;

wherein the ASE light output level is adjusted such that an optical level obtained by subtracting an optical level of the wavelength bandwidth blocked by the first splitter and the second splitter in the pre-amplifier from the ASE optical output level output from the post-amplifier at the node in a previous stage corresponds to the optical level of n waves; and wherein the pre-amplifier receives the wavelength multiplexing signal of the wavelength number n from a post-amplifier at the previous node and conducts the gain setting of the pre-amplifier utilizing ASE light of the wavelength multiplexing signal.

3. The WDM optical transmission apparatus according to claim 1, further comprising:

a shutter for blocking a wavelength multiplexing signal input to the post-amplifier;

wherein an optical surge output from the post-amplifier is prevented by closing the shutter such that the wavelength multiplexing signal is not input to the post-amplifier when the mode of the post-amplifier is shifted to ASE mode and opening the shutter such that the wavelength multiplexing signal is input to the post-amplifier after shifting of the mode of the post-amplifier to the AGC mode.

4. A method of setting the gain of a pre-amplifier of a WDM optical transmission apparatus having the pre-amplifier and a post-amplifier and placed at a node of a ring network or of an open ring network, the method comprising the steps of:

for the pre-amplifier, setting two control modes consisting of ALC mode in which the gain of an optical amplifier is controlled such that the total output of the optical amplifier is constant with respect to the multiplexing wavelength number n and of AGC mode that is a control mode for maintaining constant the ratio of an optical input level to an output optical level;

setting two control modes consisting of ASE mode in which the gain of the post-amplifier is set higher than that in the AGC mode and is set such that the output level of an ASE light corresponds to the multiplexing wavelength number n, and of AGC mode; and in the ASE mode, outputting the ASE light of the post-amplifier and setting the gain of the pre-amplifier in the WDM optical transmission apparatus at the next node under the ALC control utilizing the ASE light.

5. The method of setting the gain of a pre-amplifier of a WDM optical transmission apparatus according to claim 4, further comprising the steps of:

providing a shutter for blocking the input of a wavelength multiplexing signal on the input side of the post-amplifier; and closing the shutter such that the wavelength multiplexing signal is not input to the post-amplifier when the gain setting of the pre-amplifier at the next node is conducted utilizing the ASE light, and outputting only ASE light at a constant level at all times from the post-amplifier so as to allow the gain setting of the pre-amplifier to be conducted only by the ASE output light at all times.

6. The method of setting the gain of a pre-amplifier of a WDM optical transmission apparatus according to claim 5, further comprising the steps of:

allowing the shutter to block through light and add light at a node in the ring network or the open ring network;

with the shutter being blocked, sending channel alarm information to a downstream node; and in only a corresponding span, conducting the gain setting of a pre-amplifier at the next node by the ASE light of the post-amplifier.

7. The method of setting the gain of a pre-amplifier of a WDM optical transmission apparatus according to claim 5, wherein an optical monitoring signal (OSC) is sent as an ASE light output request to the post-amplifier section at the previous node when the gain setting of a pre-amplifier is necessary;

wherein the post-amplifier section closes the WDM shutter and shifts to the ASE mode after the post-amplifier section has received the ASE light output request;

wherein the post-amplifier section notifies the pre-amplifier at the next node needing the gain setting of the pre-amplifier of ASE light output stabilization information at the moment when the ASE light output becomes stable, the post-amplifier section giving a permission to start the gain setting in ALC mode to the pre-amplifier section;

wherein the pre-amplifier conducts the gain setting in ALC mode utilizing the ASE light after the pre-amplifier has received the ASE light output stabilization information from the post-amplifier of the post-amplifier section at the previous node, the pre-amplifier thereafter shifting to AGC mode and ceasing sending the ASE light output request to the post-amplifier section at the previous node; and wherein in the post-amplifier section at the previous node, the post-amplifier shifts to the AGC mode at the time when the ASE light output request ceases to be received, to open the WDM shutter and cease notifying the pre-amplifier at the next node of the ASE light output stability information.

8. The method of setting the gain of a pre-amplifier of a WDM optical transmission apparatus according to claim 4, wherein the gain setting is conducted when the unit mounted with the pre-amplifier is replaced with another.

9. The method of setting the gain of a pre-amplifier of a WDM optical transmission apparatus according to claim 4, wherein after recovery from an APSD (Automatic Power Shut Down) in a span, a pre-amplifier section in the span detects the recovery from the APSD, sends an ASE request to the post-amplifier at the previous node and conducts again the gain setting of the pre-amplifier.

10. The method of setting the gain of a pre-amplifier of a WDM optical transmission apparatus according to claim 4, wherein, after one node has recovered from a power shut down, the pre-amplifier at the node sends an ASE request to the post-amplifier at the previous node and conducts again the gain setting of the pre-amplifier.

11. The method of setting the gain of a pre-amplifier of a WDM optical transmission apparatus according to claim 4, further comprising the steps of:

setting the post-amplifier to the ASE mode, to allow ASE light to be sent out to conduct the gain setting in the ACL mode at the pre-amplifier at the next node; and in a span having a multiplexed wavelength of one (1) or more waves, setting the post-amplifier to the AGC mode, to conduct the gain setting of the pre-amplifier at the next node in ALC mode utilizing output light of the post-amplifier.

12. The method of setting the gain of a pre-amplifier of a WDM optical transmission apparatus according to claim 5, further comprising the steps of:

regardless of the input wavelength number to the post-amplifier section, closing the WDM shutter of the post-amplifier section, setting the post-amplifier to the ASE mode to allow ASE light to be output, and setting the post-amplifier at the next node to ALC mode; and conducting the gain setting of the pre-amplifier using the ASE light.

13. The method of setting the gain of a pre-amplifier of a WDM optical transmission apparatus according to claim 4, wherein when all the nodes are activated during the recovery from a power shut down of the entire ring network or the entire open ring network, the pre-amplifier at each node sends an ASE request to the post-amplifier at each previous node, the WDM shutter being closed in the post-amplifier section in each node to allow all the spans to be independent from each other; and wherein each span conducts in parallel the gain setting of a pre-amplifier.

14. The method of setting the gain of a pre-amplifier of a WDM optical transmission apparatus according to claim 6, wherein an optical monitoring signal (OSC) is sent as an ASE light output request to the post-amplifier section at the previous node when the gain setting of a pre-amplifier is necessary:

wherein the post-amplifier section closes WDM shutter and shifts to the ASE mode after the post-amplifier section has received the ASE light output request;

wherein the post-amplifier section notifies the pre-amplifier at the next node needing the gain setting of the pre-amplifier of ASE light output stabilization information at the moment when the ASE light output becomes stable, the post-amplifier section giving a permission to start the gain setting in ALC mode to the pre-amplifier section;

wherein the pre-amplifier conducts the gain setting in ALC mode utilizing the ASE light after the pre-amplifier has received the ASE light output stabilization information from the post-amplifier of the post-amplifier section at the previous node, the pre-amplifier thereafter shifting to AGC mode and ceasing sending the ASE light output request to the post-amplifier section at the previous node; and wherein in the post-amplifier section at the previous node, the post-amplifier shifts to the AGC mode at the time when the ASE light output request ceases to be received, to open the WDM shutter and cease notifying the pre-amplifier at the next mode of the ASE light output stability information.

* * * * *

UNITED STATES PATENT AND TRADEMARK OFFICE
CERTIFICATE OF CORRECTION

PATENT NO.       : 7,002,734 B2
APPLICATION NO.  : 10/336712
DATED            : February 21, 2006
INVENTOR(S)      : Kazunori Horachi et al.

It is certified that error appears in the above-identified patent and that said Letters Patent is hereby corrected as shown below:

On Title Page, Column 2 (U.S. Patent Documents), Line 3, delete "Degrande" and insert -- DeGrange -- therefor.
On Title Page, Column 2 (U.S. Patent Documents), Line 4, delete "250/214 LA" and insert -- 205/214.0LA -- therefor.
Column 19, Line 10, delete "ACL" and insert -- ALC-- therefor.
Column 19, Line 24, delete "post-amplifier" and insert -- pre-amplifier -- therefor.
Column 20, Line 8, after "necessary" delete ":" and insert -- ; -- therefor.
Column 20, Line 10, after "closes" insert -- the -- therefor.
Column 20, Line 33, delete "mode" and insert -- node -- therefor.

Signed and Sealed this

Twelfth Day of December, 2006

JON W. DUDAS
*Director of the United States Patent and Trademark Office*